(12) United States Patent
Kamada et al.

(10) Patent No.: US 11,204,448 B2
(45) Date of Patent: Dec. 21, 2021

(54) SURFACE PROTECTIVE FILM

(71) Applicant: BANDO CHEMICAL INDUSTRIES, LTD., Hyogo (JP)

(72) Inventors: Yutaka Kamada, Hyogo (JP); Masahiro Yamaguchi, Hyogo (JP)

(73) Assignee: BANDO CHEMICAL INDUSTRIES, LTD., Hyogo (JP)

( * ) Notice: Subject to any disclaimer, the term of this patent is extended or adjusted under 35 U.S.C. 154(b) by 0 days.

(21) Appl. No.: 16/721,956

(22) Filed: Dec. 20, 2019

(65) Prior Publication Data

US 2020/0199312 A1   Jun. 25, 2020

(30) Foreign Application Priority Data

Dec. 21, 2018  (JP) .............. JP2018-239964

(51) Int. Cl.
*C08G 18/44*   (2006.01)
*G02B 1/04*   (2006.01)
*G02B 1/14*   (2015.01)
*C08J 5/18*   (2006.01)
*C08G 18/32*   (2006.01)
*C08G 18/75*   (2006.01)

(52) U.S. Cl.
CPC .......... *G02B 1/14* (2015.01); *C08G 18/3206* (2013.01); *C08G 18/44* (2013.01); *C08G 18/755* (2013.01); *C08J 5/18* (2013.01); *G02B 1/04* (2013.01); *C08J 2375/04* (2013.01); *C08J 2375/06* (2013.01); *Y10T 428/24355* (2015.01)

(58) Field of Classification Search
CPC ...... C08J 5/18; C08J 2375/04; C08J 2375/06; G02B 1/04; G02B 1/14; C08G 18/3206; C08G 18/44; C08G 18/755; C08G 18/24; C08G 18/4238; C08G 18/664; C08G 18/6644; Y10T 428/24355; Y10T 428/24364; C09D 175/06; G09F 9/00; B32B 3/30
See application file for complete search history.

(56) References Cited

U.S. PATENT DOCUMENTS

| | | | | |
|---|---|---|---|---|
| 2017/0107398 A1* | 4/2017 | Ho | ........................ | C08G 18/73 |
| 2017/0283650 A1* | 10/2017 | Liu | .................... | C08G 18/3215 |
| 2018/0345639 A1* | 12/2018 | Kamada | .................. | B32B 27/08 |
| 2018/0364822 A1* | 12/2018 | Taya | ...................... | B32B 27/26 |

FOREIGN PATENT DOCUMENTS

| | | |
|---|---|---|
| WO | 2017094480 | 6/2017 |
| WO | 2018038069 | 3/2018 |

* cited by examiner

*Primary Examiner* — Nancy R Johnson
(74) *Attorney, Agent, or Firm* — JCIP Global Inc.

(57) ABSTRACT

There is provided a surface protective film having an excellent writing sensation when a touch pen is used. A surface protective film has a protective layer made of a polyurethane on the outermost surface, and the protective layer has an arithmetic average roughness (Ra) of 0.3 μm or more and 0.6 μm or less, and a maximum height (Rz) of 1.5 μm or more and 3.5 μm or less.

4 Claims, 4 Drawing Sheets

SURFACE PROTECTIVE FILM

CROSS-REFERENCE TO RELATED APPLICATIONS

This application claims the priority benefit of Japanese Patent Application No. 2018-239964, filed on Dec. 21, 2018. The entirety of the above-mentioned patent application is hereby incorporated by reference herein and made a part of this specification.

BACKGROUND

Technical Field

The disclosure relates to a surface protective film having a writing sensation like that of paper when memo writing, drawing, or the like is performed on an E-book reader and the like using a touch pen.

Description of Related Art

Electronic devices including a display that is operated through a capacitance touch panel such as smartphones, tablet PCs, E-book readers, electronic memo pads, and pen tablets have become widespread. In such electronic devices, in order to protect a transparent substrate on a display surface, a surface protective film is bonded thereto in some cases. Optical transparency, non-coloring properties, weather resistance, plasticizer resistance, antifouling properties and the like are required for the surface protective film.

Regarding such a surface protective film, for example, the applicant and others proposed a surface protective film in which three layers including a protective layer made of a thermosetting polyurethane which is a cured product of a polyether polyol, an aliphatic isocyanate, an alcohol-based curing agent, and a non-amine type catalyst, a transparent substrate film, and an adhesive layer are laminated in that order in Patent Document 1 (PCT International Publication No. WO2017/094480) and a surface protective film in which three layers including a protective layer made of a polycarbonate-based polyurethane, a transparent substrate film, and an adhesive layer are laminated in that order in Patent Document 2 (PCT International Publication No. WO2018/038069).

In such electronic devices, memo writing, drawing, and the like are performed using a touch pen in some cases. However, these electronic devices generally have a transparent substrate made of glass, a polycarbonate, or the like on the outermost surface, and these transparent substrates have high hardness so that a writing sensation with a touch pen is poor and there is a demand for a writing sensation equivalent to that on actual paper with a ballpoint pen.

SUMMARY

The disclosure provides a surface protective film having an excellent writing sensation when a touch pen is used.

An aspect of the disclosure provides a surface protective film includes: a protective layer made of a polyurethane on the outermost surface thereof, wherein the protective layer has an arithmetic average roughness (Ra) of 0.3 μm or more and 0.6 μm or less and a maximum height (Rz) of 1.5 μm or more and 3.5 μm or less.

DESCRIPTION OF THE EMBODIMENTS

The disclosure provides a surface protective film includes: a protective layer made of a polyurethane on the outermost surface thereof, wherein the protective layer has an arithmetic average roughness (Ra) of 0.3 μm or more and 0.6 μm or less and a maximum height (Rz) of 1.5 μm or more and 3.5 μm or less.

According to an embodiment of the disclosure, in the surface protective film, an average length (RSm) of a roughness curve element of the protective layer is 90 μm or more and 160 μm or less.

According to an embodiment of the disclosure, in the surface protective film, the protective layer has an international rubber hardness (IRHD) of 87.0 or more and 98.0 or less.

According to an embodiment of the disclosure, in the surface protective film, the protective layer has a thickness of 50 μm or more and 400 μm or less.

According to an embodiment of the disclosure, in the surface protective film, the polyurethane is of a polycarbonate-based polyurethane or a polyester-based polyurethane.

Figure 1:
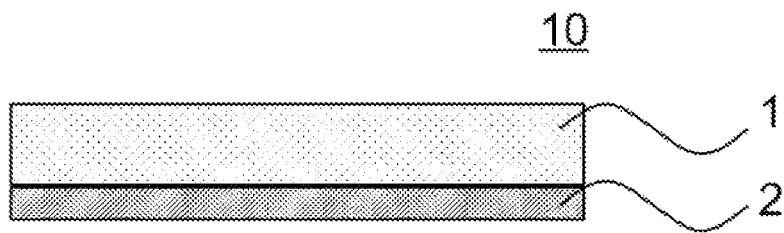
FIG. 1 is a diagram showing a surface protective film according to an embodiment of the disclosure.
Figure 2:
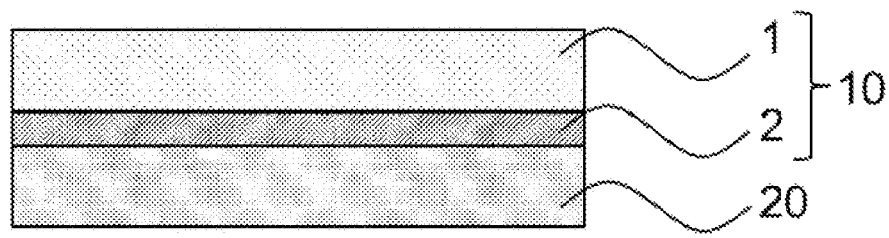
FIG. 2 is a diagram showing a state in which a surface protective film according to an embodiment of the disclosure is bonded to a transparent substrate on a display surface.

FIGS. 1 and 2 respectively show a surface protective film according to an embodiment of the disclosure, and a state in which the surface protective film according to an embodiment is bonded to a transparent substrate positioned on a surface of a display. Here, in FIGS. 1 and 2, the thicknesses of the layers do not reflect actual thicknesses.

In a surface protective film 10 according to an embodiment, a protective layer 1 made of a polyurethane and an adhesive layer 2 are laminated in that order. In addition, the surface protective film 10 according to an embodiment is bonded to a transparent substrate 20 via the adhesive layer 2. In this manner, the surface protective film of the disclosure is attached to a surface of the transparent substrate, and the surface protective film prevents the transparent substrate from being scratched, cracking, and becoming contaminated.

"Protective Layer"

The protective layer is made of a polyurethane. The polyurethane is a cast type thermosetting polyurethane obtained by thermally curing liquid material composition including at least a polyol, an isocyanate, and an alcohol-based curing agent. Here, in the disclosure, the polyurethane used to form the protective layer can contain various additives such as a colorant, a light stabilizer, a heat stabilizer, an antioxidant, an antifungal agent, a flame retardant, and a lubricant as necessary within a range in which required characteristics are not impaired.

a. Polyol

Regarding the polyol, a polyether-based polyol, i.e., polyoxyalkylene glycols such as polyethylene glycol, polypropylene glycol, and polyoxytetramethylene glycol or alkylene oxide adducts such as those of ethylene oxide, or propylene oxide of bisphenol A, and glycerin; polyester-based polyols obtained by a polymerization reaction of a dibasic acid such as adipic acid, phthalic anhydride, isophthalic acid, maleic acid, and fumaric acid and glycols such as ethylene glycol, propylene glycol, 1,4-butanediol, 1,6-hexanediol, and trimethylolpropane; polycaprolactone-based polyols such as polycaprolactone glycol, polycaprolactone triol, and polycaprolactone tetraol; polycarbonate-based polyols such as polycarbonate glycol, polycarbonate triol, and polycarbonate tetraol; and derivatives thereof in which a side chain or a branch structure is introduced thereinto, modified products thereof, a mixture thereof and the like can be used.

Among these, a polycarbonate-based polyurethane obtained from a polycarbonate-based polyol has excellent plasticizer resistance and can be prevented from swelling due to the transferring of a plasticizer due to contact with rubber products or the like. In addition, a polyester-based polyurethane obtained from a polyester-based polyol has excellent plasticizer resistance and oil resistance and can be performed from swelling due to the transferring of a plasticizer and various oil components such as hand cream and sunscreen.

a1. Polycarbonate-Based Polyol

Examples of the polycarbonate-based polyol include a reaction product of a dialkyl carbonate and a diol. In addition, as the polycarbonate-based polyol, for example, a polycarbonate glycol, a polycarbonate triol, a polycarbonate tetraol, and derivatives thereof in which a side chain or a branched structure is introduced thereinto, modified products thereof, a mixture thereof, and the like can be used.

Examples of the dialkyl carbonate include a dialkyl carbonate such as dimethyl carbonate and diethyl carbonate, a diaryl carbonate such as diphenyl carbonate, and an alkylene carbonate such as ethylene carbonate. These may be used alone or two or more thereof may be used in combination.

Examples of the diol include 1,4-butanediol, diethylene glycol, 1,5-pentanediol, 1,6-hexanediol, 1,7-heptanediol, 1,8-octanediol, 2-methyl-1,8-octanediol, 1,9-nonanediol, 1,10-dodecanediol, 2-ethyl-1,6-hexanediol, 3-methyl-1,5-pentanediol, 2,4-dimethyl-1,5-pentanediol, neopentyl glycol, 1,3-cyclohexanediol, 1,4-cyclohexanediol, 1,4-cyclohexanedimethanol, and 2,2'-bis(4-hydroxycyclohexyl)-propane. These may be used alone or two or more thereof may be used in combination. Regarding the diol, an aliphatic diol or alicyclic diol having 4 to 9 carbon atoms is desirable, for example, preferably, 1,4-butanediol, diethylene glycol, 1,5-pentanediol, 1,6-hexanediol, 3-methyl-1,5-pentanediol, 2,4-dimethyl-1,5-pentanediol, 1,4-cyclohexanedimethanol, 1,7-heptanediol, 1,8-octanediol, 2-methyl-1,8-octanediol, and 1,9-nonanediol are used alone or two or more thereof are used in combination. In addition, those having no branching structures are more desirable.

a2. Polyester-Based Polyol

Examples of polyester-based polyols include polyester-based polyols obtained by a polymerization reaction of a dibasic acid such as succinic acid, adipic acid, phthalic anhydride, isophthalic acid, maleic acid, and fumaric acid, and glycols such as ethylene glycol, propylene glycol, 1,4-butanediol, 1,6-hexanediol, and trimethylolpropane. Among these, a succinic ester polyurethane in which succinic acid is used as a dibasic acid is desirable because it has particularly excellent oil resistance.

The number average molecular weight of the polyol is preferably 200 or more and 10,000 or less, more preferably 500 or more and 5,000 or less, and further more preferably 800 or more and 3,000 or less. When the number average molecular weight is less than 200, the reaction occurs too fast, handleability is poor, and a molded body loses its flexibility and thus becomes brittle in some cases. On the other hand, when the number average molecular weight is greater than 10,000, the viscosity becomes too high, handleability is poor, and a molded body may become crystallized and thus become cloudy in some cases. Here, in the disclosure, the number average molecular weight refers to a molecular weight that is calculated from a hydroxyl value of a polyol measured according to JIS K 1557. However, values beyond the above numerical value range are not excluded as long as they are within the spirit and scope of the disclosure.

b. Isocyanate

Isocyanates can be used without particular limitation as long as they have two or more isocyanate groups in a molecule. For example, tolylene diisocyanate, tolidine diisocyanate, diphenylmethane diisocyanate, polymethylene polyphenyl polyisocyanate, carbodiimidized diphenylmethane polyisocyanate, crude diphenylmethane diisocyanate, xylylene diisocyanate, 1,5-naphthalene diisocyanate, tetramethylxylene diisocyanate, isophorone diisocyanate, hydrogenated diphenylmethane diisocyanate, hydrogenated xylylene diisocyanate, hexamethylene diisocyanate, dimer acid diisocyanate, norbornene diisocyanate, and the like can be used. Among these, two or more types may be used in combination.

In the disclosure, in the polyurethane used to form the protective layer, an aliphatic isocyanate having no aromatic ring is preferably used as an isocyanate component. A polyurethane obtained from an aliphatic isocyanate is unlikely to yellow and can prevent the polyurethane from discoloring due to light and heat from a light source, sunlight, and the like and can prevent transparency from deteriorating.

c. Alcohol-Based Curing Agent

In the polyurethane used to form the protective layer of the disclosure, an alcohol-based curing agent is used as a curing agent. The alcohol-based curing agent has a weaker adverse effect on human bodies and the environment than an amine-based curing agent.

Alcohol-based curing agents can be used without particular limitation as long as they have two or more hydroxy groups in a molecule. For example, dihydric alcohols such as ethylene glycol, 1,3-propanediol, 2-methyl-1,3-propanediol, 1,3-butanediol, 1,4-butanediol, 1,5-pentanediol, neopentyl glycol (2,2-dimethyl-1,3-propanediol), 1,6-hexanediol, polyethylene glycol, polypropylene glycol, polybutylene glycol, cyclohexane dimethanol, and a hydrogenated bisphenol A, trihydric alcohols such as glycerin, trimethylolpropane, butanetriol, pentanetriol, hexanetriol, cyclopentanetriol, and cyclohexanetriol, and trihydric or higher alcohols such as pentaerythritol, dipentaerythritol, and tetramethylolpropane may be exemplified. Among these, in consideration of handleability and mechanical properties, 1,4-butanediol is desirable as a dihydric alcohol, and in order to prevent cloudiness, a dihydric alcohol having a cyclic structure such as cyclohexanedimethanol and a hydrogenated bisphenol A is desirable. In consideration of handleability and mechanical properties, trimethylolpropane is desirable as a trihydric alcohol.

It is desirable to use dihydric alcohol and trihydric alcohol together due to the fact that a molded body crystallizes and is cloudy in some cases when dihydric alcohol is independently used as an alcohol-based curing agent and the fact that strength decreases when trihydric alcohol is used as a main component. Specifically, it is desirable to use a dihydric alcohol in a range of 40 to 100 parts by weight and a trihydric alcohol in a range of 60 to 0 parts by weight, and it is more desirable to use a dihydric alcohol in a range of 60 to 80 parts by weight and a trihydric alcohol in a range of 40 to 20 parts by weight. Moreover, in a case in which a cloudy state occurs when 1,4-butanediol is used as a dihydric alcohol, a part or all of 1,4-butanediol may be replaced with a dihydric alcohol having a cyclic structure such as cyclohexanedimethanol and a hydrogenated bisphenol A.

d. Catalyst

Preferably, the polyurethane used to form the protective layer of the disclosure is thermally cured in the presence of a non-amine type catalyst. When a non-amine type catalyst is used, it is possible to obtain a polyurethane having excellent non-coloring properties, transparency, and weather resistance. On the other hand, in a polyurethane that is thermally cured in the presence of an amine type catalyst, emitted light turns yellow and an appearance becomes colored over time in some cases. Examples of the non-amine type catalyst include an organic tin compound such as di-n-butyl tin dilaurate, dimethyl tin dilaurate, dibutyltin oxide, and octane tin, an organic titanium compound, an organic zirconium compound, a carboxylic acid tin salt, and bismuth carboxylates. Among these, an organic tin compound is desirable because then a reaction rate is easily adjusted.

It is desirable that 0.0005 wt % or more and 3.0 wt % or less of the non-amine catalyst be added with respect to the total amount of a. to c. described above. When the proportion is less than 0.0005 weight %, the reaction rate is not sufficiently high, and it is not possible to efficiently obtain a molded body in some cases. When the proportion is higher than 3.0 weight %, the reaction rate is too high, and thus problems may occur, such as for example, it not being possible to obtain a molded body with a uniform thickness, heat resistance and weather resistance of the molded body deteriorating, light transmittance being lowered, and the molded body becoming colored. However, values beyond the above numerical value range are not excluded as long as they are within the spirit and scope of the disclosure.

e. Silicone-Based Additive

In the surface protective film of the disclosure, the polyurethane used to form the protective layer preferably contains a Silicone-based additive. When the polyurethane contains a silicone-based additive, it is possible to improve slipperiness and comfortably perform a touch panel operation using a touch pen, a finger, or the like. The lower limit of the amount of the silicone-based additive to be added is preferably 0.05 weight % or more, more preferably 0.1 weight % or more, and further more preferably 0.3 weight % or more with respect to a total amount of a. to c. described above. In addition, the upper limit of the amount of the Silicone-based additive to be added is preferably 10.0 weight % or less, more preferably 9.0 weight % or less, and further more preferably 7.0 weight % or less with respect to a total amount of a. to c. described above. When the amount of the silicone-based additive to be added is less than 0.05 weight %, the sufficient improvement of slipperiness is not provided in some cases. On the other hand, when the amount of the silicone-based additive to be added is larger than 10.0 weight %, the slipperiness becomes too good and thus the pen tip of the touch pen may slide too much in some cases. However, values beyond the above numerical value range are not excluded as long as they are within the spirit and scope of the disclosure.

The silicone-based additive can be included in the polyurethane by adding it to material composition before the polyurethane is thermally cured and thermally curing the material composition. In addition, regarding the Silicone-based additive, a non-reactive additive that does not form a covalent bond with a crosslinked network formed by a polyol, an isocyanate, and an alcohol-based curing agent is preferably used. Since the non-reactive Silicone-based additive gradually bleeds out to the surface of the protective layer, it is possible to impart slipperiness over a long time. Silicone-based additives can be used without particular limitation as long as they are not phase-separated from the material composition before thermally curing. For example, a polyether-modified polydimethylsiloxane, a polyaralkyl-modified polydimethylsiloxane, and a long chain alkyl-modified polydimethylsiloxane can be used. Specifically, the commercial products KF352A, KF615A, X22-4515, KF410, KF412, and the like (commercially available from Shin-Etsu Chemical Co., Ltd.) can be used.

The protective layer is a molded body made of a cast type thermosetting polyurethane obtained by thermally curing liquid material composition including at least a polyol, an isocyanate, and an alcohol-based curing agent in the presence of a catalyst, and regarding a molding method thereof, any of a one-shot method, a prepolymer method, and a pseudo prepolymer method may be used.

In the one-shot method, a polyol, an isocyanate, and an alcohol-based curing agent, optional additives, and a catalyst are added together and thermally cured, and thereby a polyurethane molded body can be produced.

In the prepolymer method, a polyol and a stoichiometrically excess amount of an isocyanate are reacted to prepare a prepolymer having an isocyanate group at its end in advance, predetermined amounts of an alcohol-based curing agent, optional additives, and a catalyst are mixed thereinto, the prepolymer is thermally cured, and thereby a polyurethane molded body can be produced.

In the pseudo prepolymer method, a part of a polyol is mixed with an alcohol-based curing agent in advance, and a prepolymer is prepared using the remaining polyol and an isocyanate. In addition, it is possible to prepare a molded body made of a polycarbonate-based polyurethane by mixing a mixture of a polyol and an alcohol-based curing agent which have been mixed in advance, optional additives, and a catalyst with the prepared prepolymer and thermally curing them.

In the disclosure, a ratio (—OH/—NCO: hereinafter referred to as an "a ratio") between the number of moles of hydroxyl groups (—OH) contained in an alcohol-based curing agent and the number of moles of isocyanate groups (—NCO) of an isocyanate or a prepolymer in a material composition in which a polyurethane is not thermally cured is more preferably 0.8 or more and 1.5 or less. When the a ratio is less than 0.8, mechanical properties are unstable, and when the a ratio is greater than 1.5, surface tackiness increases, and a favorable writing sensation is impaired. In addition, the a ratio is more preferably 1.05 or more and 1.3 or less because then the polyurethane constituting the protective layer is appropriately deformed and scratch resistance is improved.

In addition, the polyurethane preferably does not have an acrylic framework (an acrylic framework or a methacrylic framework). That is, the polyurethane used to form the protective layer of the disclosure preferably does not contain an acrylic-modified polyurethane. A polyurethane having an acrylic framework may impair the flexibility of the polyurethane and lower the mechanical strength such as wear resistance and tear strength, and emitted light may be colored due to a residue of the catalyst used to introduce an acrylic framework or a methacrylic framework.

In the surface protective film of the disclosure, the protective layer has an arithmetic average roughness (Ra) of 0.3 µm or more and 0.6 µm or less, and a maximum height (Rz) of 1.5 µm or more and 3.5 µm or less.

In addition, the average length (RSm) of the roughness curve element of the protective layer is preferably 90 µm or more and 160 µm or less. In the surface protective film of the disclosure that has the above surface shape, the behavior of the dynamic friction coefficient with respect to the load when writing is performed on the surface protective film with a touch pen is similar to the behavior of the dynamic friction coefficient with respect to the load when writing is performed on paper with a ballpoint pen, and a writing sensation equivalent to that on paper with a ballpoint pen is obtained. The detailed reason why a writing sensation changes depending on the surface shape is not clear, but it is inferred to be caused by the size of the contact area between the surface protective film and the pen tip of the touch pen. Here, in the disclosure, the surface shape of the protective layer means a value measured according to the method in the following example.

The surface protective film of the disclosure has the above surface shape and thus has light diffusibility. That is, the surface protective film of the disclosure has a haze value of 3% or more and 40% or less. In addition, preferably, the total light transmittance of the surface protective film of the disclosure is 60% or more when a blue light cut layer that cuts out visible light in a blue range is provided, and is 90% or more when no blue light cut layer is provided.

The surface protective film of the disclosure preferably has an international rubber hardness (IRHD) of polyurethane of 87.0 or more and 98.0 or less. When the international rubber hardness is less than 87.0, the surface protective film may be scratched during an operation with a touch pen. When the international rubber hardness is larger than 98.0, since the pen tip is not pushed into the protective layer, a feeling of resistance during an operation with a touch pen is reduced and the movement of the pen becomes too light.

A thickness of the protective layer is preferably 50 µm or more and 400 µm or less and more preferably 100 µm or more and 300 µm or less. When the protective layer has a thickness of 50 µm or more and 400 µm or less, excellent writing sensation and slipperiness of a touch pen and excellent operability and self-repairability are provided. When the thickness of the protective layer is less than 50 µm, a writing sensation and self-repairability deteriorate. When the thickness of the protective layer is larger than 400 µm, writing sensation, slipperiness, operability, and self-repairability are reduced and it is difficult to perform molding to have a uniform thickness. When the thickness of the protective layer is 50 µm or more and 400 µm or less, performance required for the surface protective film is exhibited in a well-balanced manner, and the production is easy. Here, in the disclosure, the thickness of the protective layer means an average value of thicknesses measured at 10 points or more using a digital indicator (product name: ABS Digimatic Indicator ID-CX, commercially available from Mitutoyo Corporation).

"Adhesive Layer"

The adhesive layer is used to bond a surface protective film to a transparent substrate on a display surface. The type of the adhesive is not particularly limited, and an adhesive made of an acrylic resin, an epoxy resin, a urethane resin, a silicone resin, or the like can be used. Among these, an adhesive made of an acrylic resin can be attached to a transparent substrate on which a surface treatment such as an antifouling treatment and a low reflection treatment has been performed. In addition, an adhesive made of a silicone resin has excellent wetting properties, causes less bubbles when it is attached to a transparent substrate, and has favorable removal properties, and hardly any thereof remains at the time of peeled off. The thickness of the adhesive layer is generally within a range of 5 µm or more and 60 µm or less, and can be appropriately adjusted according to required specifications.

"Surface Protective Film"

In the surface protective film 10 according to an embodiment, two layers including the protective layer 1 made of a polyurethane and the adhesive layer 2 are laminated in that order. The surface protective film of the disclosure is not limited to this embodiment, and can include, for example, a transparent substrate that supports a protective film, an intermediate layer for improving adhesion between layers, a blue light cut layer that cuts out blue light, and the like.

Figure 3:
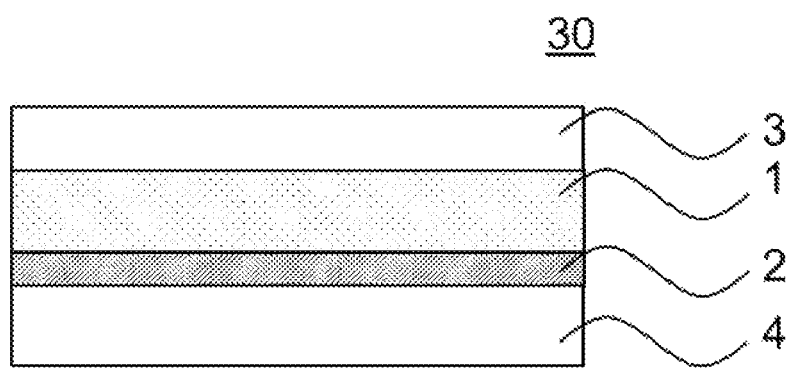
FIG. 3 is a diagram showing a surface protective film laminate.

In order to protect the surface protective film of the disclosure until it is attached to a transparent substrate on a display surface, a mold release film is adhered to a surface on the side of the protective layer of the surface protective film and a release film is adhered to the other surface to form a surface protective film laminate. FIG. 3 shows a surface protective film laminate 30 in which a mold release film 3 and a release film 4 are adhered to the surface protective film 10 according to an embodiment. Here, in FIG. 3, the thicknesses of the layers do not reflect actual thicknesses.

The mold release film is provided to prevent contamination, adhesion of dust, scratches, and the like on the protective layer, and it is desirable to use a film in which a mold release treatment is performed on a surface on the side bonded to the protective layer. When the mold release film which has been subjected to a release treatment is released from the protective layer, a mold release agent moves to the protective layer surface and can impart slipperiness to the protective layer surface immediately after the mold release film is released, and thus it is possible to perform a touch operation without causing uncomfortable feeling immediately after starting of using. In addition, as will be described in detail in the following "method of producing a protective layer," the protective layer can be directly molded on the mold release film. In this case, in order to prevent deformation during heating when material composition is thermally cured to form a protective layer, the thickness of the mold release film is preferably 50 µm or more and 300 µm or less, and the thicker thickness is more desirable.

The release film is preferably bonded to the adhesive layer in order to prevent contamination, adhesion of dust, decrease in the adhesive force, and the like. The release film is not particularly limited, and a film in which a mold release treatment is performed on a surface on the side bonded to the adhesive layer can be suitably used.

"Method of Producing a Protective Layer"

A method of producing a protective layer of the disclosure is not particularly limited as long as it is possible to produce a protective layer having a predetermined surface shape. However, a method in which uncured material composition is thermally cured using a polymer film having irregularities or the like as a mold, and the irregularities are transferred to produce a protective layer made of a polyurethane is desirable. Specifically, the protective layer can be produced by sending an uncured material composition into a gap between first and second gap maintaining members that are conveyed by a pair of rolls that are disposed apart from each other, introducing the material composition that is held between the two gap maintaining members into a heating device, thermally curing the material composition to form a protective layer made of a polyurethane, and transferring a surface shape of any one of the first and second gap maintaining members to the protective layer. The material composition includes at least a polyol, an isocyanate (or a urethane prepolymer made of them), and an alcohol-based curing agent.

Figure 4:
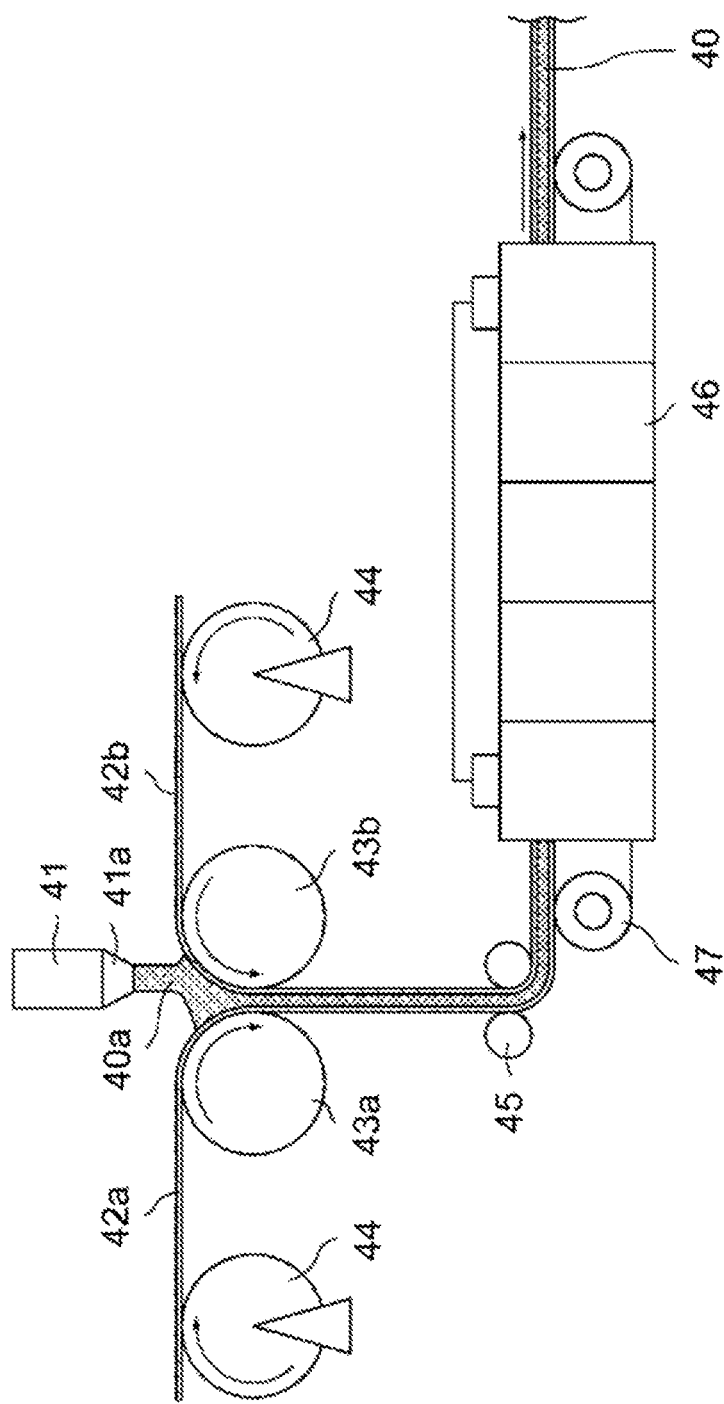
FIG. 4 is a diagram showing a method of producing a protective layer of a surface protective film.

FIG. 4 is a schematic diagram showing a method of producing a protective layer. Hereinafter, a method of producing a protective layer will be described with reference to FIG. 4.

A material composition 40a is poured into a gap between first and second gap maintaining members 42a and 42b that are conveyed by a pair of conveyance rolls 43a and 43b that are disposed apart from each other using a casting machine 41. The first and second gap maintaining members 42a and 42b while holding the material composition 40a therebetween are introduced into a heating device 46. The material composition 40a that is held between the first and second gap maintaining members 42a and 42b is thermally cured to form a polyurethane sheet-like article 40. Here, in FIG. 4, 44 indicates a conveyance roll for conveying the first and second gap maintaining members 42a and 42b, 45 indicates an auxiliary roll, and 47 indicates a conveyor belt through which the first and second gap maintaining members 42a and 42b that hold the material composition 40a therebetween are conveyed into the heating device 46.

One of the first and second gap maintaining members 42a and 42b has irregularities for transferring a surface shape to the protective layer on the surface in contact with the material composition. The first and second gap maintaining members 42a and 42b can be used without particular limitation as long as they are materials that do not thermally deform when the material composition is thermally cured. For example, an elongated film made of a polymer material such as polyethylene terephthalate (PET), polyethylene naphthalate (PEN), polycarbonate (PC), a cyclic olefin resin (COP), or polyimide (PI) can be used. Here, in the schematic diagram shown in FIG. 4, an elongated film made of a polymer material is used as a gap maintaining member. However, an endless belt made of such a polymer material or a metal material such as aluminum can be used.

Since the first and second gap maintaining members 42a and 42b that hold the material composition 40a therebetween are pulled at the same tension and conveyed, a gap therebetween can be maintained at a constant size. The material composition 40a that is interposed between the first and second gap maintaining members 42a and 42b is cured while a constant thickness is maintained, and thereby the sheet-like article 40 having excellent thickness accuracy is obtained. According to the production method, it is possible to continuously mold the sheet-like article 40 having a thickness of 50 μm or more, which is not easily obtained by coating, and has practical optical properties as a protective layer of the surface protective film.

A position of a head part 41a of the casting machine 41 is preferably unevenly located on the side of one of the conveyance rolls rather than at the center of the conveyance rolls 43a and 43b (the center of the gap formed by the first and second gap maintaining members 42a and 42b), and an unevenly distributed distance is preferably equal to or less than the radius of the conveyance roll. That is, a part directly below the head part 41a of the casting machine 41 is preferably positioned between the center of the pair of conveyance rolls 43a and 43b and the central axis of one conveyance roll. In addition, the shortest distance between a tip of the head part 41a and the surface of the conveyance roll is preferably 5 cm or less. When the head part 41a is provided in this manner, it is possible to further improve thickness accuracy of the sheet-like article 40, bubbles are unlikely to enter the uncured material composition 40a poured into the gap between the first and second gap maintaining members 42a and 42b, and entrained bubbles can easily escape.

The conveyance rolls 43a and 43b may simply have only a conveyance function, but are preferably heating rolls. When the conveyance rolls are heating rolls, the material composition 40a can be cured immediately after it is held in the gap between the first and second gap maintaining members 42a and 42b, it is possible to maintain the thickness more uniformly until the material composition 40a is introduced into the heating device 46, and it is possible to mold the sheet-like article 40 having superior thickness accuracy. When the conveyance roll is heated, a conveyance surface temperature is preferably set to 10° C. or higher and 60° C. or lower. When the temperature is lower than 10° C., the viscosity of the material composition 40a increases, bubbles cannot easily escape, a curing reaction occurs slowly, and the thickness accuracy of the sheet-like article 40 decreases. When the temperature exceeds 60° C., the material composition 40a may be cured on the conveyance roll, and bubbles may enter the sheet-like article 40.

The heating device 46 is a heating furnace including a heater, and may be any device that can increase the temperature in the furnace to a curing temperature of the material composition 40a. In addition, heating conditions (curing conditions) in the heating device 46 are not particularly limited, and may be appropriately set according to a composition of the material composition 40a. For example, conditions of 40° C. or higher and 160° C. or lower and 1 minute or longer and 180 minutes or shorter may be set. An elongated laminate formed of the first gap maintaining member 42a, the polyurethane sheet-like article 40, and the second gap maintaining member 42b is unloaded from the heating device 46. Then, the sheet-like article 40 of the elongated laminate becomes the protective layer of the surface protective film of the disclosure.

"Method of Producing a Surface Protective Film Laminate"

In the above production method, one of the first gap maintaining member 42a and the second gap maintaining member 42b can serve as the mold release film 3 having irregularities and the other thereof can serve as the release film 4. In this case, regarding the release film 4, a transfer film which includes the adhesive layer 2 and can transfer the adhesive layer 2 to the polyurethane sheet-like article 40 is used. When the first gap maintaining member 42a serves as the mold release film 3, and the second gap maintaining member 42b serves as the release film 4 and the adhesive layer 2, an elongated laminate formed of the first gap maintaining member 42a serving as a mold release film, the polyurethane sheet-like article 40 serving as a protective layer, and the second gap maintaining member 42b serving as a release film and an adhesive layer is unloaded according to the above production method.

According to this production method, the surface protective film laminate 30 can be continuously produced in a so-called roll-to-roll manner. Since the produced surface protective film laminate 30 includes a mold release film 3 and a release film 4 on both surfaces, respectively, and it is possible to prevent the surface protective film from being scratched, contaminated, or the like and has excellent handleability.

The surface protective film laminate that is wound in a roll form may be shipped or the surface protective film laminate that is cut into a sheet form may be shipped. In addition, an elongated laminate formed of the first gap maintaining member 42a, the polyurethane sheet-like article 40, and the second gap maintaining member 42b or the elongated laminate that is cut into a sheet-like laminate may be shipped, and the adhesive layer may be formed by coating in a display factory or the like, and can be bonded to a transparent substrate of the display.

Here, the above production method is only an example, for example, a releasable film can be used as the second gap maintaining member 42b, and after it is peeled off, the adhesive layer can be provided by coating or the like.

EXAMPLES

The disclosure will be described below in further detail with reference to examples, and the disclosure is not limited to these examples.

Example 1

5.7 g of 1,4-butanediol, 3.8 g of trimethylolpropane, 36.7 g of isophorone diisocyanate (IPDI), 0.7 g of a silicone additive (product name: BYK302, commercially available from BYK Japan), and 50 ppm of an organic tin compound were added to 53.8 g of a polycarbonate diol (product name: NIPPOLLAN 965, commercially available from Tosoh Corporation), and the mixture was stirred and mixed to obtain a material composition.

Using a PET film having an Ra of 0.52 μm, an Rz of 3.12 μm, and an RSm of 114 μm and having a thickness of 125 μm on which a silicone mold release treatment was performed as a first gap maintaining member, and a film including 3 layers (a PET film with a thickness of 100 μm/an adhesive layer with a thickness of 50 μm/and a release film with a thickness of 75 μm) as a second gap maintaining member, a surface protective film laminate having a protective layer with a thickness of 150 μm was produced according to the above production method.

Example 2

A surface protective film laminate having a protective layer with a thickness of 150 μm was produced in the same manner as in Example 1 except that a PET film having an Ra of 0.39 μm, an Rz of 2.58 μm, and an RSm of 116.7 μm and having a thickness of 125 μm and on which a silicone mold release treatment was performed was used as a first gap maintaining member.

Comparative Example 1

A surface protective film laminate having a protective layer with a thickness of 150 μm was produced in the same manner as in Example 1 except that a PET film having an Ra of 0.323 μm, an Rz of 3.79 μm, and an RSm of 110.7 μm and having a thickness of 125 μm and on which a silicone mold release treatment was performed was used as a first gap maintaining member.

The surface protective film laminates produced in Examples 1 and 2, and Comparative Example 1 and a commercially available surface protective film (product name: paper-like film: TB-A17FLAPL, base film: PET, commercially available from Elecom Co., Ltd.) as a reference example were subjected to the following evaluations. The results are shown in Table 1.

Surface Roughness

A 5 cm square sample was cut out from the prepared surface protective film laminate, the film on the front side was peeled off, and the sample was set on a horizontal table by bonding with an adhesive layer so that the side of the protective layer was at the top, and measurement was performed three times at random positions using a surface roughness measuring machine (device name: SURFTEST SV-3000, commercially available from Mitutoyo Corporation).

Measurement conditions were set such that stylus: standard stylus (12AAC731), measurement length: 7.5 mm, range: 800 μm, speed: 0.5 mm/s, R surface automatic measurement: Off, overrange: interrupted, pitch 1.0 μm, the number of measurement points: 7,500, and detector: detector (0.75 mN).

Evaluation conditions were set such that standard: JIS 2001, evaluation curve type: R_J01, reference length 2.5 mm, the number of sections: 1, λc: 0.8 mm, λs: 0.008 mm, filter type: Gaussian, evaluation length: 2.5 mm, forward range: 0.4 mm, rearward range: 0.004 mm, and smooth connection: Off.

Respective average values of the obtained measured values (Ra, Rz, RSm) were calculated.

Dynamic Friction Coefficient

A 15 cm×5 cm sample was cut out from the prepared surface protective film laminate, and the films on both sides were peeled off and bonded to a measurement table of a surface property measurement instrument with an adhesive layer, and the dynamic friction coefficient of the surface of the protective layer was then measured under the following conditions.

Surface property measurement instrument (device name: TYPE14, commercially available from Shinto Scientific Co., Ltd.)

Load: 100 to 500 g

Speed: 600 mm/min

Counterpart material: touch pen (POM, commercially available from Wacom, tip shape: φ0.8 mm, 1.4 mm)

Angle: 60 degrees

Dynamic friction coefficient: average value of dynamic friction coefficient at 2 cm to 10 cm.

In addition, the dynamic friction coefficient was measured in the same manner as above except that general copy paper (PPC PAPER High White A4, thickness: 0.093 mm, basis weight: 68 g/m$^2$) was cut to 15 cm×5 cm and three overlapping sheets thereof were prepared, and one short side of the paper was fixed on the measurement table of the surface property measurement instrument with a curing tape so that the paper did not turn during measurement, and a ballpoint pen (product name: SA-7N (ball diameter: 0.7 mm, black) and SA-14CN (ball diameter: 1.4 mm, black) commercially available from Mitsubishi Pencil Co., Ltd.) was used as a counterpart material.

Figure 5:
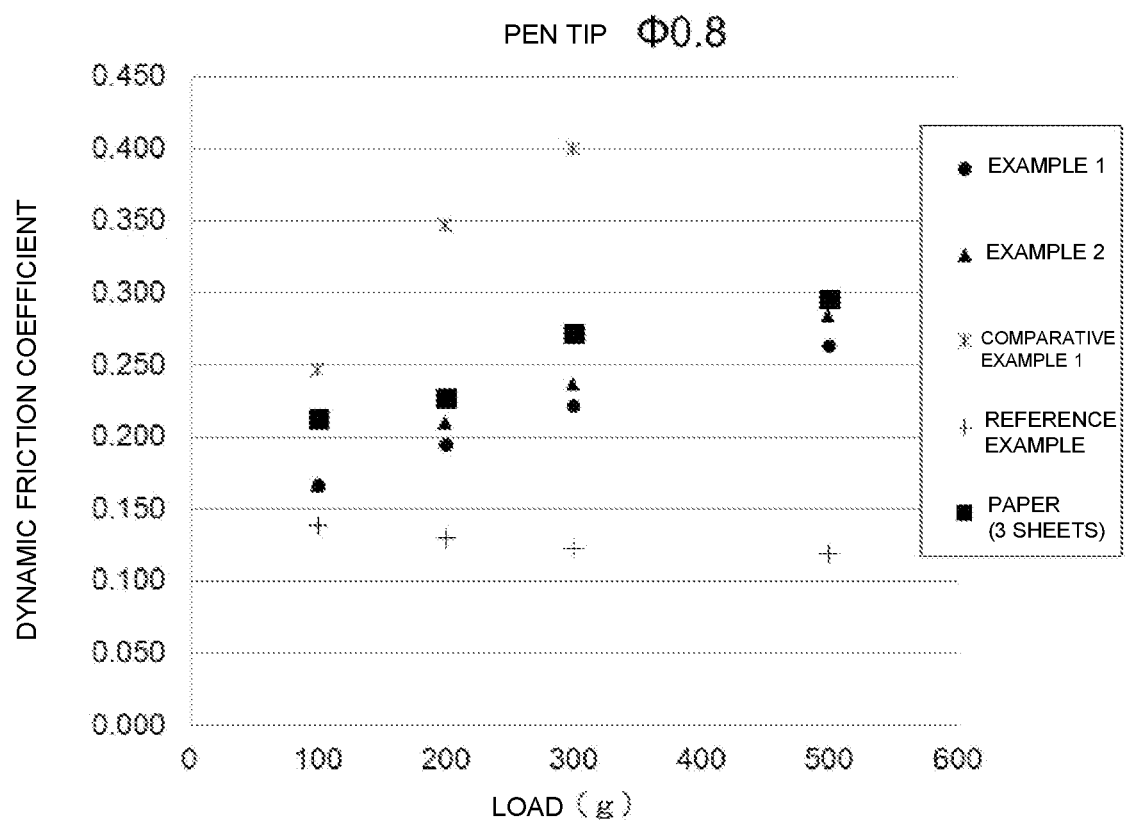
FIG. 5 is a diagram showing the relationship between a load and a dynamic friction coefficient when a touch pen with a pen tip of φ0.8 mm and a ballpoint pen with a ball diameter of 0.7 mm are used.
Figure 6:
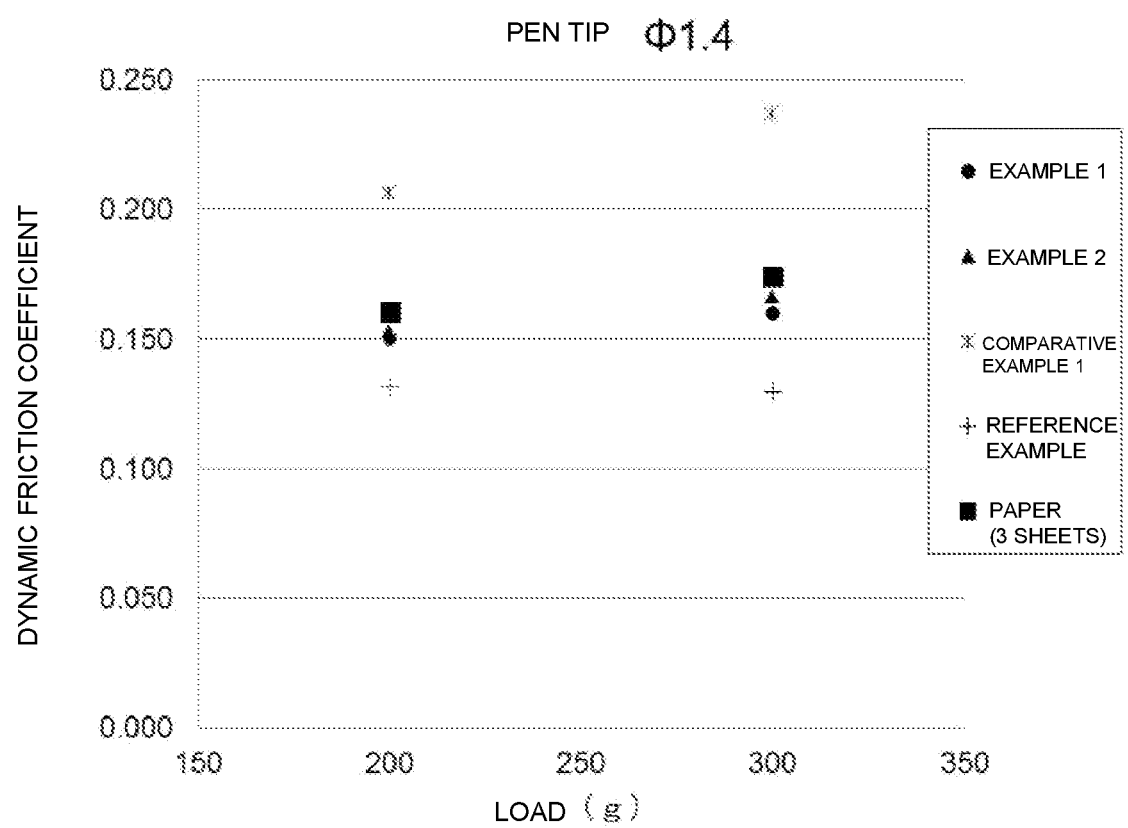
FIG. 6 is a diagram showing the relationship between a load and a dynamic friction coefficient when a touch pen with a pen tip of φ1.4 mm and a ballpoint pen with a ball diameter of 1.4 mm are used.

FIG. 5 shows the relationship between the load and the dynamic friction coefficient when a touch pen with a pen tip of φ0.8 mm and a ballpoint pen with a ball diameter of 0.7 mm were used. FIG. 6 shows the relationship between the load and the dynamic friction coefficient when a touch pen with a pen tip of φ1.4 mm and a ballpoint pen with a ball diameter of 1.4 mm were used.

Writing Sensation

A touch pen with a tip shape of 0.8 mm was moved on the sample after the dynamic friction coefficient was measured to draw a straight line and a number of 0 to 9, and a writing sensation was evaluated based on the following criteria.

O: Had a writing sensation equivalent to that of drawing on paper with a ballpoint pen x: Had a writing sensation with discomfort compared to drawing on paper with a ballpoint pen International Rubber Hardness (IRHD)

A 1 cm square sample was cut out from the prepared surface protective film laminate, films on both sides were peeled off, and then the hardness on the side of the protective layer was measured using an IRHD rubber hardness tester (commercially available from Hilde) according to JIS K 6253-2.

TABLE 1

| | Surface roughness | | | Dynamic friction coefficient | | | | | | Hardness | Writing sensation | |
|---|---|---|---|---|---|---|---|---|---|---|---|---|
| | | | | φ0.8 (0.7 mm in case of ballpoint pen) | | | | φ1.4 | | | | |
| | Ra | Rz | RSm | Load | | | | Load | | | Straight | |
| | [µm] | [µm] | [µm] | 100 g | 200 g | 300 g | 500 g | 200 g | 300 g | (IRHD) | line | Number |
| Example 1 | 0.460 | 2.686 | 116.1 | 0.166 | 0.194 | 0.221 | 0.263 | 0.150 | 0.160 | 96 | o | o |
| Example 2 | 0.428 | 2.808 | 135.7 | 0.166 | 0.209 | 0.236 | 0.283 | 0.153 | 0.166 | 96 | o | o |
| Comparative Example 1 | 0.235 | 2.693 | 113.3 | 0.246 | 0.346 | 0.399 | 0.43 | 0.206 | 0.237 | 96 | x | x |
| Reference Example | 0.264 | 8.083 | 400 or more | 0.139 | 0.130 | 0.123 | 0.119 | 0.131 | 0.129 | 100 | o | x |
| Paper (3 sheets) | — | — | — | 0.213 | 0.227 | 0.272 | 0.296 | 0.161 | 0.174 | — | — | — |

The relationship between the load and the dynamic friction coefficient for the surface protective films of Examples 1 and 2 according to the disclosure was similar to the relationship between the load and the dynamic friction coefficient for paper with a ballpoint pen, and had an excellent writing sensation.

The surface protective film of Comparative Example 1 had a large dynamic friction coefficient and heavy pen movement.

The commercially available surface protective film as a reference example had a dynamic friction coefficient that was not proportional to the load and was almost the same. When a touch pen was actually moved, a writing sensation for a straight line was favorable. However, in the case of a complex shape like a number, the dynamic friction coefficient was almost constant with respect to the change in the load according to movement, thus the pen tip felt slippery.

In the surface protective film of the disclosure, the protective layer made of a polyurethane has a specific surface shape, and thus a writing sensation with a touch pen is favorable, and a writing sensation equivalent to that on paper with a ballpoint pen is obtained. Therefore, the surface protective film of the disclosure can be suitably used for electronic devices such as E-book readers, electronic memo pads, and pen tablets on which an input operation such as memo writing and drawing is performed with a touch pen. In addition, since the protective layer made of a polyurethane is used in the surface protective film of the disclosure, excellent light transmittance, non-colorability, and weather resistance are provided.

A surface protective film having an international rubber hardness (IRHD) of 87.0 or more and 98.0 or less provides a favorable writing sensation with a touch pen and has excellent scratch resistance. When the protective layer has a thickness of 50 µm or more and 400 µm or less, the surface protective film of the disclosure has optical properties such that it can be used as a surface protective film, and it also has excellent self-repairability.

A protective layer made of a polycarbonate-based polyurethane has excellent plasticizer resistance, and a protective layer made of a polyester-based polyurethane has excellent plasticizer resistance and oil resistance. For this reason, discoloration, swelling, and the like do not easily occur in the protective layer made of these polyurethanes even if it comes into contact with various rubber products and oils.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A surface protective film comprising:
   a protective layer made of a polyurethane on an outermost surface thereof,
   wherein the protective layer has an arithmetic average roughness (Ra) of 0.428 µm or more and 0.6 µm or less and a maximum height (Rz) of 2.686 µm or more and 3.5 µm or less,
   an average length (RSm) of a roughness curve element of the protective layer is 90 µm or more and 160 µm or less, and
   the protective layer has a thickness of 50 µm or more and 400 µm or less.

2. The surface protective film according to claim 1, wherein the protective layer has an international rubber hardness (IRHD) of 87.0 or more and 98.0 or less.

3. The surface protective film according to claim 1, wherein the polyurethane is of a polycarbonate-based polyurethane or a polyester-based polyurethane.

4. The surface protective film according to claim 3, wherein the polyurethane is of a polycarbonate-based polyurethane or a polyester-based polyurethane.

\* \* \* \* \*